(12) United States Patent
Laaksonen et al.

(10) Patent No.: US 12,372,788 B2
(45) Date of Patent: Jul. 29, 2025

(54) USER CONTROL IN AUGMENTED REALITY

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 219 days.

(21) Appl. No.: 18/183,714

(22) Filed: Mar. 14, 2023

(65) Prior Publication Data
US 2023/0305303 A1 Sep. 28, 2023

(30) Foreign Application Priority Data

Mar. 25, 2022 (EP) ..................... 22164279

(51) Int. Cl.
| | | |
|---|---|---|
| *G02B 27/01* | (2006.01) | |
| *G06F 3/01* | (2006.01) | |
| *G06F 3/04842* | (2022.01) | |
| *G06F 3/16* | (2006.01) | |

(52) U.S. Cl.
CPC ............ *G02B 27/017* (2013.01); *G06F 3/011* (2013.01); *G06F 3/013* (2013.01); *G06F 3/017* (2013.01); *G06F 3/04842* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 10,409,464 B2 * | 9/2019 | Rainisto | ................ G06F 3/0482 |
| 10,471,305 B2 | 11/2019 | Leppanen et al. | |
| 11,070,792 B1 | 7/2021 | Elmieh et al. | |
| 2016/0113550 A1 | 4/2016 | Martin | |

(Continued)

FOREIGN PATENT DOCUMENTS

| | | |
|---|---|---|
| CN | 107957774 A | 4/2018 |
| WO | 2018/196107 A1 | 11/2018 |

OTHER PUBLICATIONS

Ju, "Footstep Detection with Hololens", American Journal of Engineering Research (AJER), vol. 7, No. 6, 2018, pp. 223-233.

(Continued)

*Primary Examiner* — Michael J Cobb
(74) *Attorney, Agent, or Firm* — McCarter & English LLP

(57) ABSTRACT

An apparatus, method and computer-program is described relating to user control in augmented reality (AR). For example, the method may comprise determining, based on motion of a user, one or more future step locations along a path. The method may also comprise displaying, via an augmented reality display device associated with the user, one or more interactive items. Each of the one or more interactive items may be associated with a respective one of the future step locations and is displayed so as to be perceived at a respective display position which is at or near said associated respective future step location. The method may also comprise detecting a control input associated with a particular interactive item, based at least in part on the user having reached a selection area which is at or near said associated future step location along the path.

19 Claims, 10 Drawing Sheets

(56) References Cited

U.S. PATENT DOCUMENTS

| | | |
|---|---|---|
| 2016/0274765 A1 | 9/2016 | Rainisto |
| 2018/0364808 A1 | 12/2018 | Pahud et al. |
| 2019/0138085 A1* | 5/2019 | Eronen ................. G06F 3/0482 |
| 2020/0294311 A1 | 9/2020 | Holz et al. |
| 2021/0142565 A1* | 5/2021 | Lekse ....................... G06F 3/01 |
| 2021/0275098 A1 | 9/2021 | Tian |
| 2021/0357021 A1 | 11/2021 | Major et al. |

OTHER PUBLICATIONS

Ozturk et al., "Real-time tracking of humans and visualization of their future footsteps in public indoor environments", Multimedia Tools and Applications, vol. 59, 2012, pp. 65-88.

Papadopoulos et al., "Interactions in Augmented and Mixed Reality: An Overview", Applied Sciences, vol. 11, No. 18, 2021, pp. 1-24.

Extended European Search Report received for corresponding European Patent Application No. 22164279.6, dated Sep. 14, 2022, 11 pages.

Velloso et al., "The Feet in Human-Computer Interaction: A Survey of Foot-Based Interaction", ACM Computing Surveys, vol. 48, No. 2, Article No. 21, pp. 1-35.

Yamamoto et al., "Foot-Step Input Method for Operating Information Devices While Jogging", International Symposium on Applications and the Internet, Jul. 28-Aug. 1, 2008, pp. 173-176.

* cited by examiner

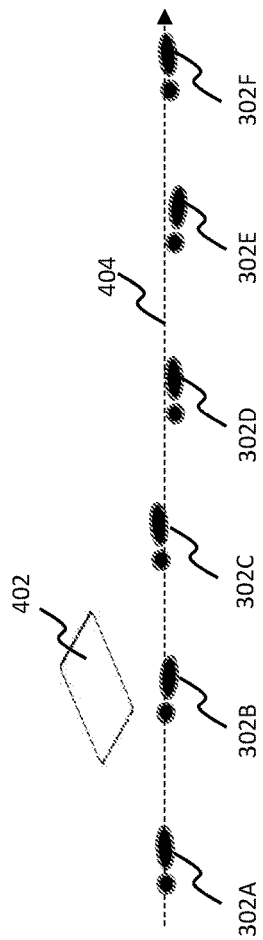
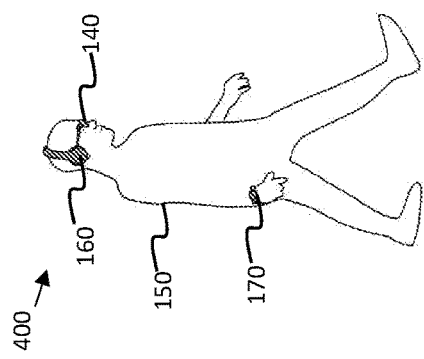
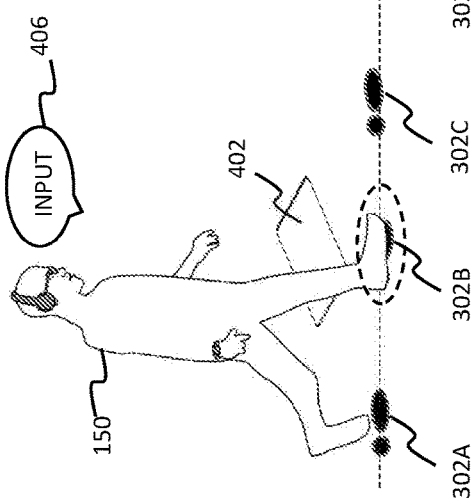
FIG. 4A
FIG. 4B

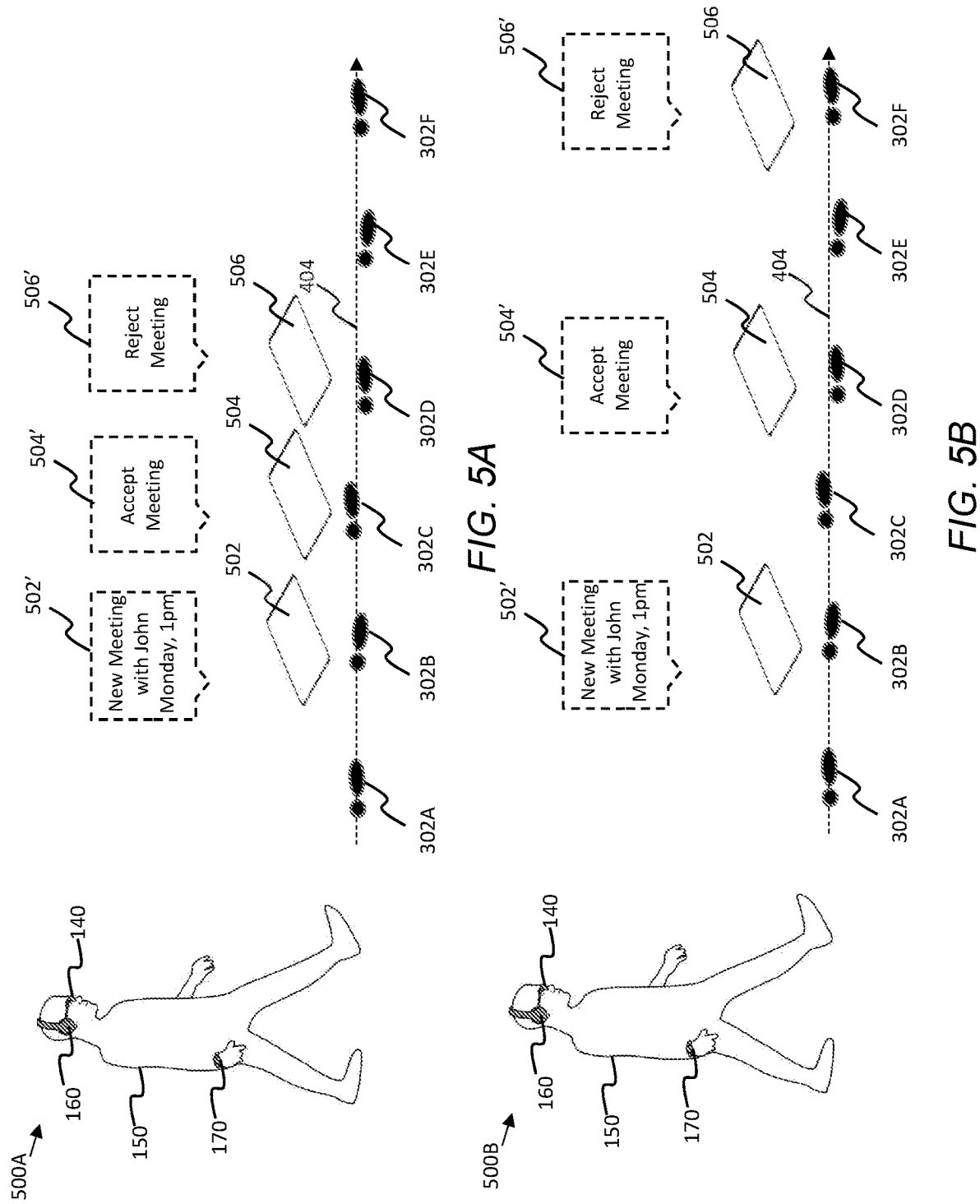

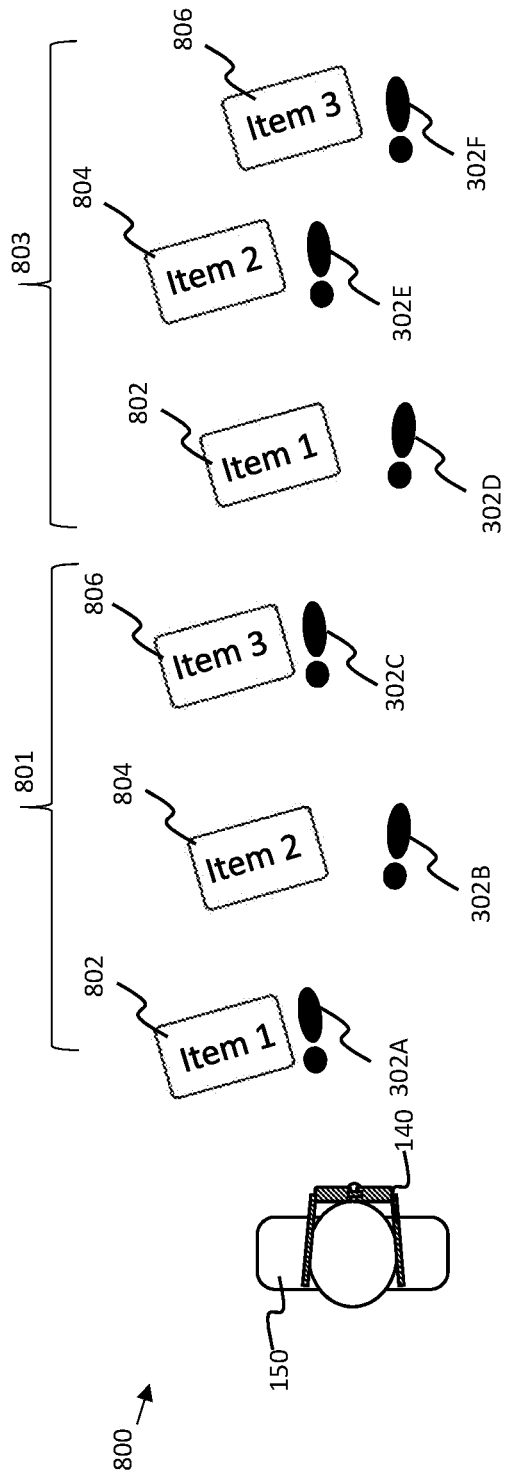
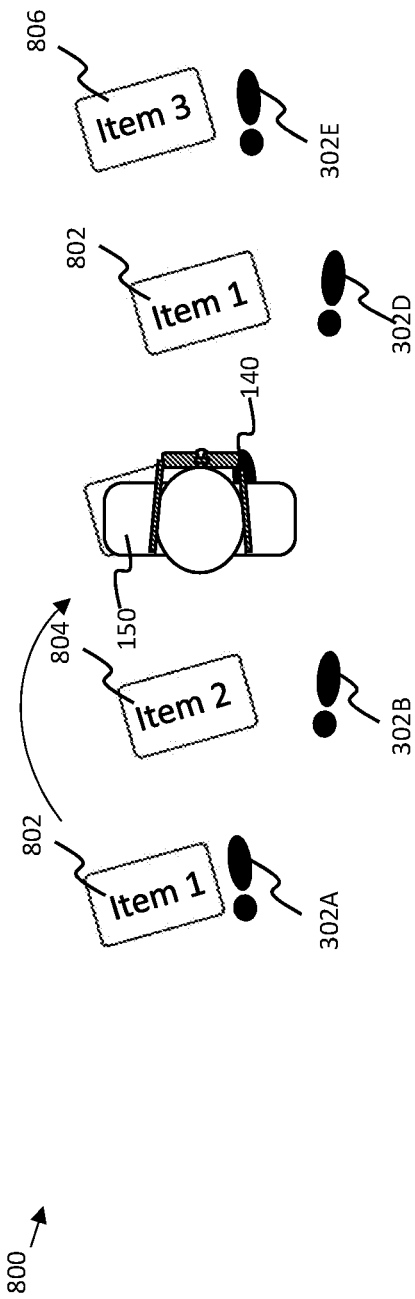
FIG. 8A
FIG. 8B

USER CONTROL IN AUGMENTED REALITY

RELATED APPLICATION

This application claims priority to European patent application number 22164279.6, filed on Mar. 25, 2022, the content of which is incorporated herein by reference in its entirety.

FIELD

Example embodiments relate to an apparatus, method and computer program for user control in augmented reality (AR) scenarios. Example embodiments may, for example, relate to detecting user control inputs associated with one or more items presented to a user via an AR display device.

BACKGROUND

The term extended reality (XR) is sometimes used to refer to a range of technologies and methods involving virtual content which may be visual and/or aural content. Common examples are virtual reality (VR), augmented reality (AR) and mixed reality (MR). AR involves the output of virtual content to augment a user's view of a real-world space seen through a user device such as glasses, goggles or even the camera and display of a handheld device which may be a smartphone or tablet computer. Thus, the user may be able to view the real-world environment around them, augmented with virtual content. The virtual content may change depending on the user's position and/or movement. The virtual content may comprise multimedia content such as pictures, photographs, video, diagrams, textual information and aural content, to give some examples. MR is similar to AR, but may be considered different in that some content is inserted into the real-world space at anchor points to give the illusion that the content is part of the real environment. As used herein, the term AR may also cover MR scenarios.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for performing: determining, based on motion of a user, one or more future step locations along a path; displaying, via an augmented reality display device associated with the user, one or more interactive items, each of the one or more interactive items being associated with a respective one of the future step locations and being displayed so as to be perceived at a respective display position which is at or near said associated respective future step location; and detecting a control input associated with a particular interactive item, based at least in part on the user having reached a selection area which is at or near said associated future step location along the path.

The apparatus may be configured to display, via the augmented reality display device, a first user notification, and at least a first interactive item providing a first control option relating to the first user notification, the first control option being associated with a first future step location along the path.

The apparatus may be further configured to display, via the augmented reality display device, a second interactive item providing a second control option relating to the first user notification, the second control option providing an alternative to the first control option, the second control option being associated with the first future step location, or a second future step location after the first future step location along the path.

If the second control option is associated with a second future step location after the first future step location, the first and second future step locations may be separated by a third step location. The third step location may have no associated interactive item.

The apparatus may be further configured to display, via the augmented reality display device, a second, different user notification, wherein at least a first control option relating to the second user notification may be associated with the third step location.

The apparatus may be configured to estimate a future time when the user will reach the selection area of the particular interactive item, wherein detecting the control input may comprise receiving a user input at or near the estimated future time.

The apparatus may be configured to monitor a position of at least part of the user relative to the selection area of the particular interactive item, wherein detecting the control input may comprise receiving a user input when the position of said at least part of the user corresponds with the selection area.

The user input may be one or more of a gesture, voice command and hardware input.

The selection area of the particular interactive item may correspond to, or surrounds, said associated future step location.

The selection area of a particular interactive item may be separate, and substantially lateral to, said associated future step location with respect to the path, wherein detecting the control input may comprise determining that at least part of the user moves sideways from the path and into the selection area.

The apparatus may be further configured to monitor an angle between a gaze direction of the user and the path, and to disable detection of a control input for at least the particular interactive item if the monitored angle is greater than a predetermined amount.

The apparatus may be configured to display a first group of interactive items at respective display positions, and a second group of interactive items, comprising the same plurality of interactive items, at later respective display positions, wherein, responsive to detecting that the user has stepped over a selection area associated with a first interactive item of the first group of interactive items, the apparatus may be configured to remove the first interactive item from the second group of interactive items so that it is not displayed.

Determining the one or more future step locations may be based on monitoring one or more motion characteristics of the user occurring in a predetermined time period prior to a current time and predicting therefrom the one or more future step locations.

The one or more motion characteristics may comprise a stride length of the user occurring in the predetermined time period. The one or more motion characteristics may further comprise a pace of the user in the predetermined time period.

The one or more motion characteristics may be received from one or more motion sensors which comprise part of, or are in communication with, the apparatus.

The one or more motion sensors may comprise one or more inertial sensors of, or in communication with, the apparatus. For example, the one or more sensors may comprise one or more of an accelerometer and gyroscope.

Determining the one or more future step locations may be further based on an environment or terrain in which the user is currently located.

According to a second aspect, this specification describes a method, comprising:
- determining, based on motion of a user, one or more future step locations along a path;
- displaying, via an augmented reality display device associated with the user, one or more interactive items, each of the one or more interactive items being associated with a respective one of the future step locations and being displayed so as to be perceived at a respective display position which is at or near said associated respective future step location; and
- detecting a control input associated with a particular interactive item, based at least in part on the user having reached a selection area which is at or near said associated future step location along the path.

The method may further comprise displaying, via the augmented reality display device, a first user notification, and at least a first interactive item providing a first control option relating to the first user notification, the first control option being associated with a first future step location along the path.

The method may further comprise displaying, via the augmented reality display device, a second interactive item providing a second control option relating to the first user notification, the second control option providing an alternative to the first control option, the second control option being associated with the first future step location, or a second future step location after the first future step location along the path.

If the second control option is associated with a second future step location after the first future step location, the first and second future step locations may be separated by a third step location. The third step location may have no associated interactive item.

The method may further comprise displaying, via the augmented reality display device, a second, different user notification, wherein at least a first control option relating to the second user notification may be associated with the third step location.

The method may further comprise estimating a future time when the user will reach the selection area of the particular interactive item, wherein detecting the control input may comprise receiving a user input at or near the estimated future time.

The method may further comprise monitoring a position of at least part of the user relative to the selection area of the particular interactive item, wherein detecting the control input may comprise receiving a user input when the position of said at least part of the user corresponds with the selection area.

The user input may be one or more of a gesture, voice command and hardware input.

The selection area of the particular interactive item may correspond to, or surrounds, said associated future step location.

The selection area of a particular interactive item may be separate, and substantially lateral to, said associated future step location with respect to the path, wherein detecting the control input may comprise determining that at least part of the user moves sideways from the path and into the selection area.

The method may further comprise monitoring an angle between a gaze direction of the user and the path, and disabling detection of a control input for at least the particular interactive item if the monitored angle is greater than a predetermined amount.

The method may further comprise displaying a first group of interactive items at respective display positions, and a second group of interactive items, comprising the same plurality of interactive items, at later respective display positions, wherein, responsive to detecting that the user has stepped over a selection area associated with a first interactive item of the first group of interactive items, the method may comprise removing the first interactive item from the second group of interactive items so that it is not displayed.

Determining the one or more future step locations may be based on monitoring one or more motion characteristics of the user occurring in a predetermined time period prior to a current time and predicting therefrom the one or more future step locations.

The one or more motion characteristics may comprise a stride length of the user occurring in the predetermined time period. The one or more motion characteristics may further comprise a pace of the user in the predetermined time period.

The one or more motion characteristics may be received from one or more motion sensors.

The one or more motion sensors may comprise one or more inertial sensors. For example, the one or more sensors may comprise one or more of an accelerometer and gyroscope.

Determining the one or more future step locations may be further based on an environment or terrain in which the user is currently located.

According to a third aspect, this specification describes a computer program comprising instructions for causing an apparatus to perform at least the following: determining, based on motion of a user, one or more future step locations along a path; displaying, via an augmented reality display device associated with the user, one or more interactive items, each of the one or more interactive items being associated with a respective one of the future step locations and being displayed so as to be perceived at a respective display position which is at or near said associated respective future step location; and detecting a control input associated with a particular interactive item, based at least in part on the user having reached a selection area which is at or near said associated future step location along the path.

Example embodiments of the third aspect may also provide any feature of the second aspect.

According to a fourth aspect, this specification describes a computer-readable medium (such as a non-transitory computer-readable medium) comprising program instructions stored thereon for performing at least the following: determining, based on motion of a user, one or more future step locations along a path; displaying, via an augmented reality display device associated with the user, one or more interactive items, each of the one or more interactive items being associated with a respective one of the future step locations and being displayed so as to be perceived at a respective display position which is at or near said associated respective future step location; and detecting a control input associated with a particular interactive item, based at least in part on the user having reached a selection area which is at or near said associated future step location along the path.

Example embodiments of the fourth aspect may also provide any feature of the second aspect.

According to a fifth aspect, this specification describes an apparatus comprising: at least one processor; and at least one memory including computer program code which, when executed by the at least one processor, causes the apparatus to: determine, based on motion of a user, one or more future step locations along a path; display, via an augmented reality display device associated with the user, one or more interactive items, each of the one or more interactive items being associated with a respective one of the future step locations and being displayed so as to be perceived at a respective display position which is at or near said associated respective future step location; and detect a control input associated with a particular interactive item, based at least in part on the user having reached a selection area which is at or near said associated future step location along the path.

Example embodiments of the fifth aspect may also provide any feature of the second aspect.

BRIEF DESCRIPTION OF DRAWINGS

Example embodiments will now be described, by way of non-limiting example, with reference to the accompanying drawings, in which:

FIG. 4A is similar to FIG. 3, wherein an interactive item is associated with a respective future step location, according to an example embodiment;

FIG. 4B is similar to FIG. 4A, showing the user at a later time when making a select input, according to an example embodiment;

FIG. 5A is similar to FIG. 3, wherein a plurality of interactive items are associated with respective future step locations, according to another example embodiment;

FIG. 5B is similar to FIG. 5A, wherein the plurality of interactive items are spaced-apart, according to another example embodiment;

FIG. 8A. is a plan view of a user traversing a path comprising a repeating sequence of interactive items, according to another example embodiment;

FIG. 8B is similar to FIG. 8A, showing the user at a later time, according to another example embodiment;

DETAILED DESCRIPTION

Figure 1:
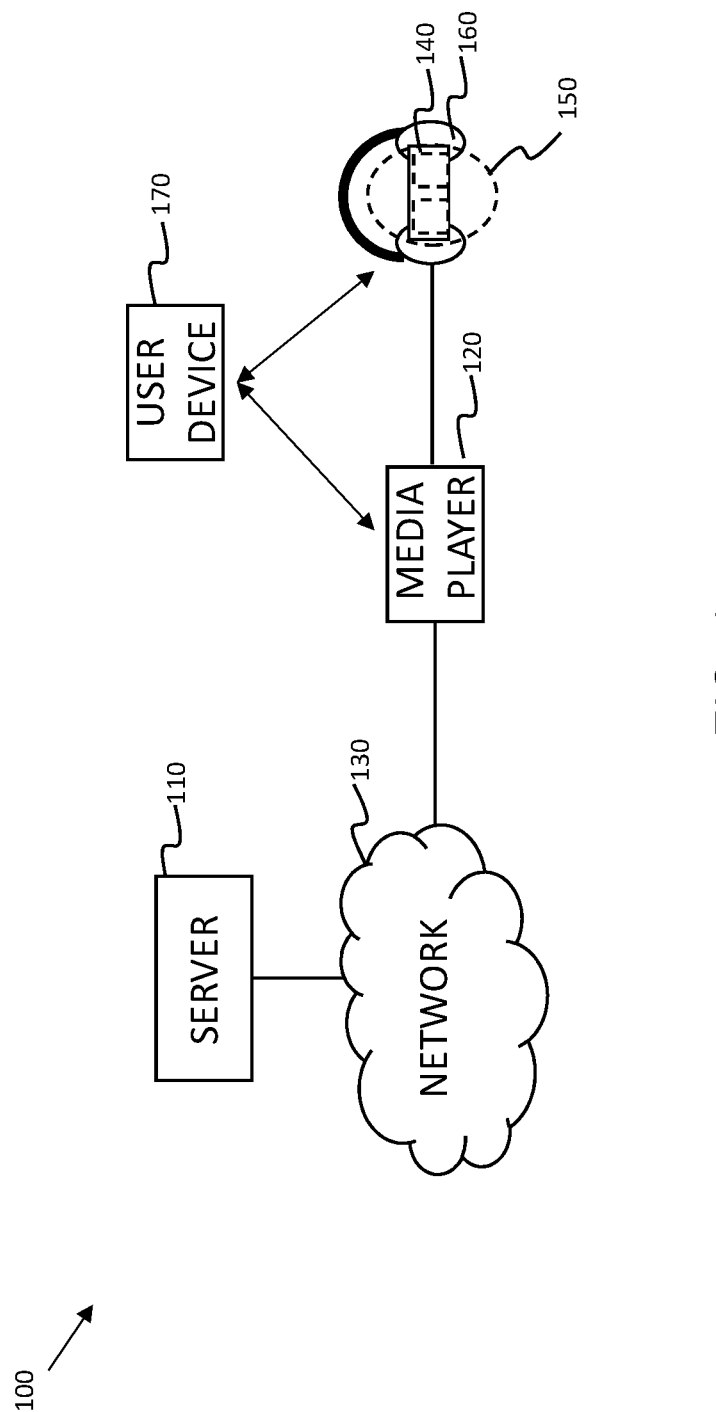
FIG. 1 is a block diagram of a system which may be useful for understanding example embodiments.

In the description and drawings, like reference numerals refer to like elements throughout.

Example embodiments relate to an apparatus, method and computer program for user control in augmented reality (AR) scenarios, and in particular for detecting control inputs associated with one or more items presented to a user via an AR display device.

Although AR scenarios will be referred to herein, it should be appreciated that the term is intended also to cover mixed reality (MR). As mentioned in the background, AR may be considered a subset of the general technology area referred to as extended reality (XR). XR generally involves the output of virtual content to one or more user devices.

Example embodiments will focus on the output of video content to one or more display means that form part of an AR display device. There may, however, be associated aural content with the video content that may be output via one or more loudspeakers of the AR display device, if provided, or a separate audio output device such as a pair of headphones or similar.

In AR, the video content is overlaid onto the user's view of the real-world space as seen through the AR display device. The AR display device may comprise a set of glasses, goggles or similar head-mounted display (HMD) device, which may comprise a pair of transparent or semi-transparent lenses onto which is or are projected the video content to augment the user's view of the real-world space as seen through the lenses. The term lens and lenses does not imply that any optical correction takes place.

The video content may comprise, for example, pictures, photographs, videos, objects and/or textual information, to give some examples. Other user devices, such as smartphones or tablet computers, may also be used as an AR display device in that a camera of the smartphone or tablet computer may capture the real-world space and present it on a display of the smartphone or tablet computer with video content overlaid.

Example embodiments will focus on HMD devices, such as a set of AR glasses having a pair of lenses. AR glasses and their method of operation are known and hence no detailed description is required.

In use, a user consumes the video content when it is output, or projected onto, lenses of the AR display device. The user may explore an AR scene by movement, and this may result in a change in what is displayed at a given time. The video content may move with the user's movement or at least some of the overlaid video content may appear stationary even if the user is moving. In other words, the overlaid video content may be anchored such that the user can move towards it, away from it, and either side of it; in some cases, the user may even move behind the overlaid video content.

The AR display device may form part of an AR system. The position of the user, which may comprise the orientation and/or spatial position of the user, may be used by a rendering engine of the AR system to output a particular set of video content. The video content may correspond to a particular portion of a scene based on the current viewport of the user. This form of user exploration, which involves both rotational and translational movement, may be referred to as six-degrees-of-freedom (6DoF) exploration.

The position of the user may be determined using any suitable means and may be based on the position of the AR display device or another device, e.g. smartphone, smartwatch or headphones carried by the user. For example, the AR display device or other device may comprise a GNSS receiver or similar configured to determine the user's position using multilateration methods. Additionally, or alternatively, one or more inertial sensors such as gyroscopes and/or accelerometers may be provided in the AR display device or other device carried by the user. Additionally, or alternatively, external sensors such as one or more cameras may be configured to track the user's position. The AR display device may further comprise one or more sensors for tracking a user's gaze direction.

In some cases, a user exploring an AR scene may wish to control a device or application. Devices to be controlled may, for example, be one of the AR display device, smartphone, smartwatch and possibly another device such as a digital assistant. Applications to be controlled may be provided and/or executed on any such device and may even be provided in cloud storage and associated with the user.

Control may be by means of a control input. The term control input may refer to any form of input that will result in performance of a computer-related function associated with one or more devices and/or applications of the user.

For example, a control input may be made in relation to an interactive item associated with an application.

For example, an interactive item may represent a music track, a movie or an e-book, respectively associated with a music application, a video application and an e-reader application.

A control input may involve selecting to open, for example, a music track on the AR display device to see more information in associated metadata. Another control input may involve selecting to play the music track via the headphones. Other control inputs may involve selecting to stop, fast-forward, rewind the music track or even to skip to the next music track in a playlist. Similar control inputs may be associated with movies and e-books.

As another example, the interactive item may represent an email or text message notification received via the user's smartphone, respectively associated with an email application and a text message application. A control input may involve selecting to open the email or text message for display on the AR display device. Another control input may involve selecting to delete the email or text message.

As another example, the interactive item may represent a calendar notification, e.g. a meeting invite, received via the user's smartphone and associated with a calendar application on the user's smartphone. A control input may involve selecting to accept the meeting invite. Another control input may involve selecting to reject the meeting invite.

Numerous other examples of interactive items and control inputs may be envisaged.

Visualizing interactive items and the manner of receiving or detecting control inputs can be problematic in many AR scenarios.

For example, if the user is moving, e.g. walking or jogging, it is important for safety reasons that they can see what is around them, e.g. other pedestrians and traffic. Requiring a user to provide control inputs by means of complex gestures, or by using their smartphone, smartwatch or other carried device (e.g. a dedicated AR controller) may be distracting or even impossible if the user is carrying something in both hands. There is a need to improve how users control devices and/or applications when using an AR display device.

Example embodiments may avoid or alleviate such issues as will be explained in detail below.

FIG. 1 is a block diagram of a system 100 which may be useful for understanding example embodiments.

The system 100 may comprise a server no, a media player 120, a network 130 and an AR display device 140 associated with a user 150. In some example embodiments, the system 100 may comprise a pair of headphones 160 associated with the user 150 and a user device 170 associated with the user. The user device 170 may comprise a smartphone or a smartwatch of the user 150 or a dedicated AR controller linked to the AR display device 140.

The server 110 may be connected to the media player 120 by means of the network 130 for sending data, e.g., a bitstream of data representing at least video data, to the media player. The server no may send the video data to the media player 120 responsive to one or more data requests sent by the media player 120. For example, the media player 120 may transmit to the server no an indication of the user's position, and the server may process and transmit back to the media player video data responsive to the received position. This may be performed in real-time or near real-time and may be by means of any suitable streaming data protocol. Alternatively, or additionally, the server no may provide one or more files representing video data to the media player 120 for storage and processing thereat. At the media player 120, the audio data and video data may be processed, rendered and output to the AR display device 140.

The user device 170 may similarly provide video data to the AR display device 140. This video data may relate to interactive items associated with one or more applications running on the user device 170. This video data may be provided via the media player 120 or directly to the AR display device.

The user 150 may also use the pair of headphones 160 if audio data is provided.

The AR display device 140 and/or the pair of headphones 160 may comprise one or more microphones for picking-up audio around the user 150 such as the user's voice. The AR display device 140 and/or the pair of headphones 160 may be configured to transmit the audio to the media player 120 and/or to the user device 170 for processing.

The AR display device 140 may comprise first and second lenses onto which video content is projected so as to be perceived by the user at one or more respective locations which overlay the real-world environment.

In example embodiments, the AR display device 140 or pair of headphones 160 may comprise head tracking sensors for indicating to the media player 120, using any suitable method, a current position of the user 150. This may determine how the video data is rendered to the AR display device 140.

In some embodiments, the media player 120 may comprise part of the AR display device 140. In other embodiments, the media player 120 may comprise a physically separate system such as a personal computer (PC), a laptop, a games console or a wearable computing device.

The network 130 may be any suitable data communications network including, for example, one or more of a radio access network (RAN) whereby communication is via one or more base stations, a WiFi network whereby communications is via one or more access points, or a short-range network such as one using the Bluetooth® or Zigbee protocol.

The user device 170 may communicate with the media player 120 or the AR display device 140 using any such network mentioned above.

Figure 2:
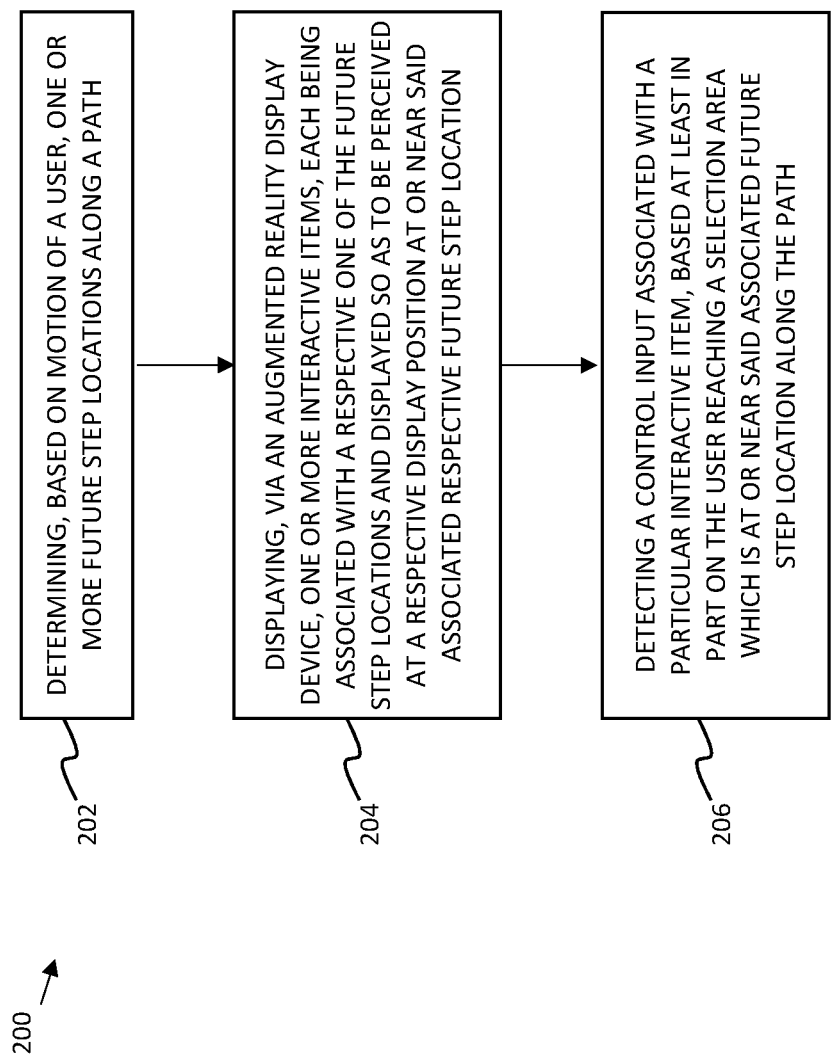
FIG. 2 is a flow diagram showing processing operations according to example embodiments.

FIG. 2 is a flow diagram showing processing operations, indicated generally by reference numeral 200, according to example embodiments.

The processing operations 200 may be performed in hardware, software, firmware, or a combination thereof. For example, the processing operations may be performed, at least in part, by the media player 120 shown in FIG. 1.

A first operation 202 may comprise determining, based on motion of a user, one or more future step locations along a path.

In this respect, the term determining may also mean "estimating."

A second operation 204 may comprise displaying, via an augmented reality display device associated with the user, one or more interactive items, each of the one or more interactive items being associated with a respective one of the future step locations and being displayed so as to be perceived at a respective display position which is at or near said associated respective future step location.

In this respect, the term displaying may also refer to "causing display of."

A third operation 206 may comprise detecting a control input associated with a particular interactive item, based at least in part on the user reaching a selection area which is at or near said associated future step location along the path.

The respective display position of an interactive item is not necessarily the same as the associated selection area.

Example embodiments may also provide an apparatus comprising means for performing the processing operations 200. The means may comprise at least one processor and at least one memory directly connected or coupled to the at least one processor. The at least one memory may include computer program code which, when executed by the at least one processor, may perform the processing operations 200 and any preferred features thereof described below.

Figure 3:
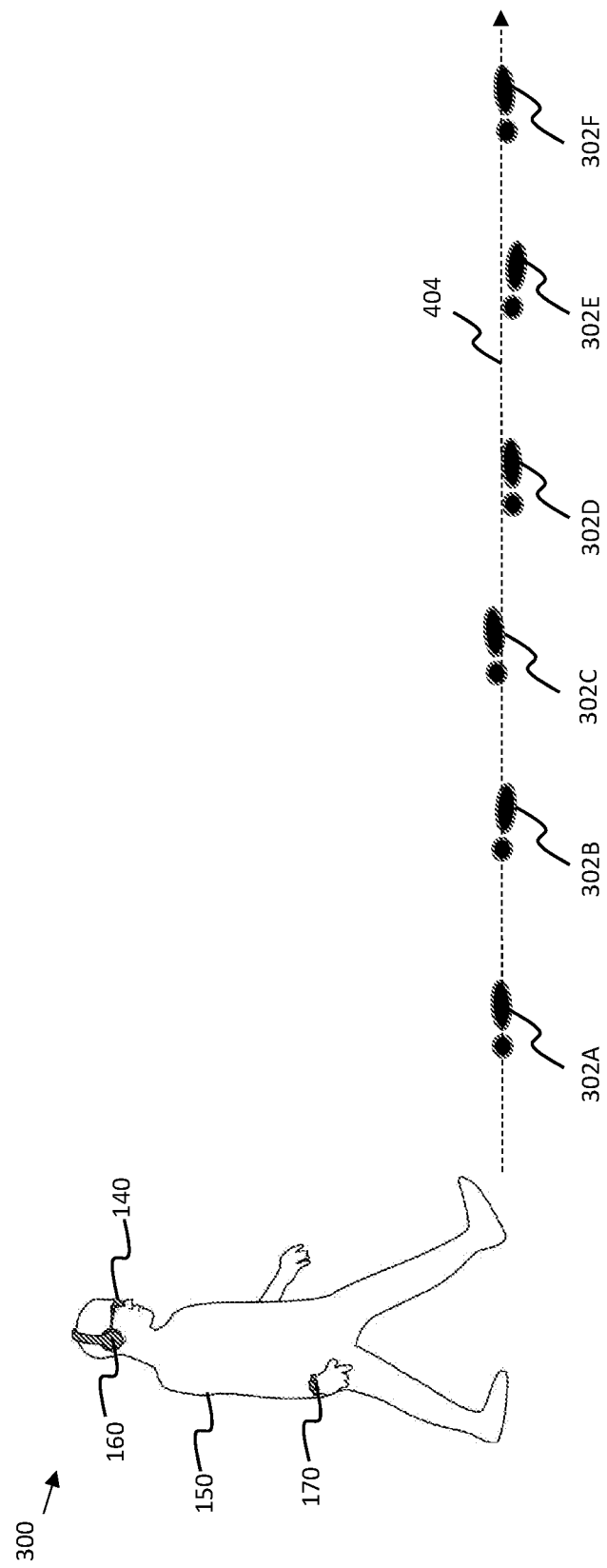
FIG. 3 is a side view of a user traversing a path which may be useful for understanding example embodiments.

FIG. 3 shows a first scenario 300 for explaining example embodiments.

In the first scenario 300, the user 150 shown in FIG. 1 is in motion when wearing the AR display device 140. The user 150 may also be wearing the pair of headphones 160 and may be wearing or carrying the user device 170 which, here, is a smartwatch.

In accordance with the first operation 202 of FIG. 2, six future step locations 302A-302F may be determined based on the motion of the user. The number of future step locations may be fewer or greater. In example embodiments, the future step locations 302A-302F may or may not be displayed or otherwise indicated to the user.

This determination of the future step locations 302A-302F may be made using any suitable method.

For example, determining the one or more future step locations 302A-302F may be based on monitoring one or more motion characteristics of the user 150 occurring in a predetermined time period, prior to a current time, and predicting therefrom the one or more future step locations.

The predetermined time period can, for example, be a thirty second period before the current time. This time period may be immediately before the current time, or well-in-advance of the current time in a training phase.

The one or more motion characteristics may comprise an average stride length of the user 150 occurring in the predetermined time period.

The average stride length may be determined in various ways.

For example, one way is to estimate a distance travelled by the user 150 in the predetermined time period and dividing this distance by the number of detected steps. The distance travelled may be determined using, for example, a GNSS receiver or similar. The number of detected steps may be calculated using one or more inertial sensors which detect step impacts.

The GNSS receiver and/or one or more inertial sensors may be provided on one or more of the AR display device 140, the pair of headphones 160 and the user device 170.

Another way of determining average stride length is to use reference data provided from an external source. The reference data may reflect the average stride length of users having the same characteristics as the user 150, e.g. in terms of sex, height and/or weight. In some example embodiments, the reference data may be provided, and possibly presented, as a form of baseline data. In a training or input stage, the user 150 may then refine the baseline data for future use. For example, the baseline data may be presented to the user 150 on the AR display device 140 as one or more future step locations along a path. The user 150 may then perform a test walk in relation to the path and manually adjust the baseline data based on where each foot actually makes impact with the ground. For example, if the user's foot impacts the ground at a different location to that presented for a future step location, the user may make an input at that time which moves the future step location to that impact location. Future step locations may be updated accordingly and the process may repeat.

The one or more motion characteristics may further comprise a pace, or speed, of the user 150. If the user is walking, for example, the average stride length may be lower than if the user is running. Therefore, monitoring the pace of the user 150 may modify the average stride length.

The one or more motion characteristics may be received from one or more motion sensors which may comprise one or more of an accelerometer and a gyroscope. The one or more sensors may be provided in the form of a wearable device which may measure or enable measurement of the user's stride length or similar. For example, the wearable device may be attached on, within or otherwise carried by, the user's shoe.

In some example embodiments, the one or more future step locations 302A-302F may be based on an environment or terrain in which the user is currently located. For example, it may be known from one or more sensors that the user 150 is walking up or down a hill, which may therefore affect the average stride length.

If the user 150 changes direction during the course of movement, the future step locations 302A-302F and hence the path 140 may change accordingly.

FIG. 4A shows a second scenario 400 which builds on the first scenario 300.

In accordance with the second operation 204 of FIG. 2, the AR display device 140 displays an interactive item 402. The interactive item 402 is associated with, in this case, the second future step location 302B.

The interactive item 402 is displayed by the AR display device 140 so as to be perceived by the user 150 at a respective display location which is at or near the second future step location 302B.

The interactive item 402 may be any graphic representation, whether an object, image, photograph, video or textual information, that a user may interact with to perform some computer-related function.

In some example embodiments, the interactive item 402 may be positioned in place of the second future step location 302B, i.e. so that the user cannot see the respective second future step location 302B.

In other example embodiments, the interactive item 402 may be positioned proximate to the second future step location 302B, e.g. to one side of the second future step location, which may be lateral to a path 404 that the user 150 is travelling along.

As shown in FIG. 4A, the interactive item 402 is displayed to the left-hand side of the second future step location 302B. Alternatively, the interactive item 402 may be displayed to the right-hand side, or even vertically above, the second future step location 302B.

FIG. 4B shows the same, second scenario 400, at a later time. It will be seen that the user 150 may provide a control input in relation to the interactive item 402 when they reach a selection area at or near the second future step location 302B along the path 404.

The selection area may correspond to, in this case, the second future step location 302B or an area that surrounds the future step location.

In some examples, the size of the selection area may be based on the user's stride length. For example, for a shorter stride length, or average stride length, the selection area may be shorter or narrower than for a longer stride length, or average stride length. The selection area may also be of a predetermined length and width, for example so that the user's estimated future step location would be within a predetermined distance of the selection area. For example, if the user's average stride length is 80 cm, the selection area could be an area that covers the estimated future step location and 10 cm before and after the step estimated location in length and 20 cm wide. The predetermined distance(s) such as the 10 cm and 20 cm values may be configurable by the user 150 or the system 100 or may be estimated based on user's stride and may vary between different users.

In some examples, each future step location may have an estimated area based on the user's stride length. In some examples, each future step location may be based on user's stride length and the user's foot length if that has been provided to the system 100. In some examples the user can provide their stride length and foot length in the system's settings or they may be received by the system 100 from an external device such as a network server.

Thus, by determining or estimating that the user 150 is at or near the second future step location 302B, as opposed to another future step location, e.g. one of the first and third future step locations 302A, 302C, the selection area for the second future step location is reached.

This process may involve estimating a future time when the user will reach the second future step location 302B. Estimating the future time can be based on, for example, the user's pace.

Alternatively, or additionally, this process may involve monitoring at least part of a user relative to, in this case, the second future step location 302B and detecting that said user part corresponds to, or is closest to, the second future step location.

For example, one or more future step locations, such as the second future step location 302B in this example, may be mapped to a respective feature or location in images captured by one or more cameras which are external to the AR display device 140. A position of the user 150, or part of the user, may be tracked, e.g. using a GNSS receiver or the like on the AR display device 140, and it may be determined when the position of the user 150 corresponds with the mapped feature or location captured by the one or more external cameras. The position of the user 150 may alternatively or additionally be tracked visually by the one or more external cameras.

Alternatively, or additionally, one or more cameras may be provided on the AR display device 140 itself. In this case, the one or more cameras may track how the user 150 moves with respect to the mapped feature or location in the captured images without needing to know the position of the user.

Alternatively, or additionally, the process may involve tracking both an impact time and position of the user 150 relative to, in this case, the second future step location 302B. In some cases, a part of the system 100 may distinguish between left and right-foot impacts. Tracking impact times in addition to position of the user 150 may provide more detailed information about the intentions of the user in terms of control inputs.

Upon reaching the second future step location 302B, the user 150 may provide a user input for the associated interactive item 402. Because the user input is timed with the user being at or near the second future step location 302B, it is known that the user input relates to the particular interactive item 402 and not any other interactive item.

The user input may be one of a gesture, a voice command and a hardware input. The user input may depend on the type of interactive item 402. For example, a hardware input may refer to an input received due to the user 150 pressing, touching/tapping, making a motion gesture or similar to an input device. For example, the input device may comprise a button, switch, and/or touch sensitive input for receiving a hardware input. The input device may be a wearable device, such as a smartwatch associated with the user device 170 and/or the AR display device 140, the user device itself, the AR display device 140, the headphones, or any other type of wearable or non-wearable input device.

In some example embodiments, a user input received after a threshold time period (e.g. 0.5 seconds) from the time the user 150 is at or near the second future step location 302B may not be detected as a control input in relation to the particular interactive item 402. This may prevent accidental selection.

As shown in FIG. 4B, the user 150 may provide a voice command 406.

For example, if the interactive item 402 represents the name of a music track, the voice input 406 may be "play" or "select" which may cause the music track to play through the pair of headphones 160. This may be by means of the "play" input being provided to the music application. Alternatively, the user 150 may use a different voice input 406 such as "skip" which may cause the next music track in a playlist to play through the pair of headphones 160. Similarly, if the interactive item 402 represents an email notification, the voice input 406 may be "open", "delete", or "archive" to give some examples. If "open", the email may be displayed. Similarly, if the interactive item 402 represents a meeting invite, the voice input 406 may be "accept" or "reject" and the corresponding action may be performed by the calendar application.

The user 150 may additionally, or alternatively, use hand gestures to provide user inputs appropriately timed to the interactive item 402. For example, the user device 170 may detect and signal one or more predetermined hand gestures corresponding to certain input types. Taking the meeting invite example, a first type of hand gesture in a first direction may correspond to an "accept" user input and a second type of hand gesture in a second direction may correspond to "reject" user input.

The placement of the interactive item 402 at, in this case, the second future step location 302B may be based on one or more of a default setting, a user-defined setting, level of activity in the user's surroundings or on the pace of the user's motion along the path 404.

For example, if the user 150 is walking slowly, the interactive item 402 might be associated with the first future step location 302A. If the user 150 is walking fast, or even jogging, the interactive item 402 might be associated with a later step location, e.g. the third future step location 302C which gives the user time to see and understand the interactive item 402. The placements may change dynamically as the user's pace changes.

In some example embodiments, the one or more interactive items may provide specific control options at respective future step locations. Such control options may be provided after a user notification indicating what the specific control options relate to, e.g. a new meeting request.

In this case, the user 150 need only provide some form of "confirm" or "select" input when they reach the future step location associated with the required interactive item. This means that more complex forms of user input, such as specific voice commands or gestures, are not required. This may improve privacy and be in addition to benefits mentioned above, e.g. enabling the user 150 to concentrate on their environment.

For example, the second operation 204 of FIG. 2 may comprise displaying, via the AR display device, a first user notification and at least a first interactive item providing a first control option relating to the first user notification. The first control option may be associated with a first future step location along the path. In some example embodiments, a second interactive item providing a second control option may provide an alternative to the first control option.

The second control option may be associated with the first future step location or the second control option may be associated with a second future step location after the first future step location along the path.

Where the second control option is associated with the first future step location, the first control option may be displayed to one side (e.g. left hand side) of the first future step location and the second control option may be displayed on the opposite side (e.g. the right hand side) of the first future step location. The user input may comprise, for example, a voice command, a particular gesture and/or hardware input, indicating which of the first and second control options is selected at the first future step location. In some embodiments, as will be explained below with reference to FIGS. 6A, 6B, 7A, 7B, a movement deviation of the user, e.g. to the left or right hand side of the first future step location, may enable the selection in this side-by-side scenario.

In examples described below with reference to FIGS. 5A-5C, it is assumed that a second control option is associated with a second future step location after the first future step location along the path.

In some embodiments, the first user notification can be displayed anywhere and is not necessarily associated with a future step location. On the other hand, the first user notification may be associated with, for example, a first future step location and the first and, if provided, second interactive item may be associated with second and third future step locations, respectively.

To illustrate, FIG. 5A shows a third scenario 500A which builds on the first scenario 300.

The AR display device 140 may display a first user notification 502. The first user notification 502 is associated with, in this case, the second future step location 302B. The first user notification 502 is displayed by the AR display device 140 so as to be perceived by the user 150 at or near the second future step location 302B.

The first user notification 502 may be any graphic representation, and in this case includes textual information.

As indicated by the dashed box 502', the first user notification 502 relates to a new meeting request received from a calendar application associated with the user 150.

The AR display device 140 may also display first and second interactive items 504, 506 respectively associated with the third and fourth future step locations 302C, 302D. The first interactive item 504 is displayed at or near the third future step location 302C and the second interactive item 506 is displayed at or near the fourth future step location 302D. As indicated by the dashed boxes 504', 506' the first interactive item 504 provides an "accept meeting" control option and the second interactive item 506 provides a "reject meeting" control option.

In accordance with the operations described, the user 150 may choose to select either the first and second interactive item 504, 506 by means of reaching the selection area at or near the respective third or fourth future step locations 302C, 302D and providing a simple confirmation or selection input of any suitable form, e.g. using a voice command, gesture or hardware input. For example, if the user 150 wishes to accept the meeting request, they travel to the third future step location 302C and say "confirm" or "select" or similar. If the user 150 wishes to reject the meeting request, they travel to the fourth future step location 302D and say "confirm" or "select" or similar.

The selected control option may then be signalled back to the appropriate application, in this case the calendar application.

FIG. 5B shows a fourth scenario 500B which is the same as the third scenario 500A other than that a different pattern of footstep locations is used for the user notifications and/or the interactive items.

As shown, a gap of at least one step location is provided between the first user notification 502 and the first interactive item 504, and also between the first interactive item 504 and the second interactive item 506. No interactive items are associated with the third and fifth future step locations 302C, 302E.

These gap spacings may give more time, and make it more convenient, for the user 150 to understand the control options and make more accurate selections; in other words, it allows more time for the user 150 to react. Which pattern to use may dynamically change based on various factors, such as the user's preferences, their environment, the surrounding traffic flow and/or the user's pace. For example, use of the fourth scenario 500B may be used in place of the third scenario 500A upon detecting that the user's pace has increased beyond a predetermined threshold. If the user is travelling at or below a first threshold speed, appropriate to a standard walking pace, the first and second interactive items 504, 506 may be close together as in the FIG. 5A example. If the user then travels faster, above the first threshold speed, the arrangement may change for future interactive items so that said interactive items are spread further apart, as in the FIG. 5B example.

Alternative associations and arrangements are possible in other embodiments.

Figure 5C:
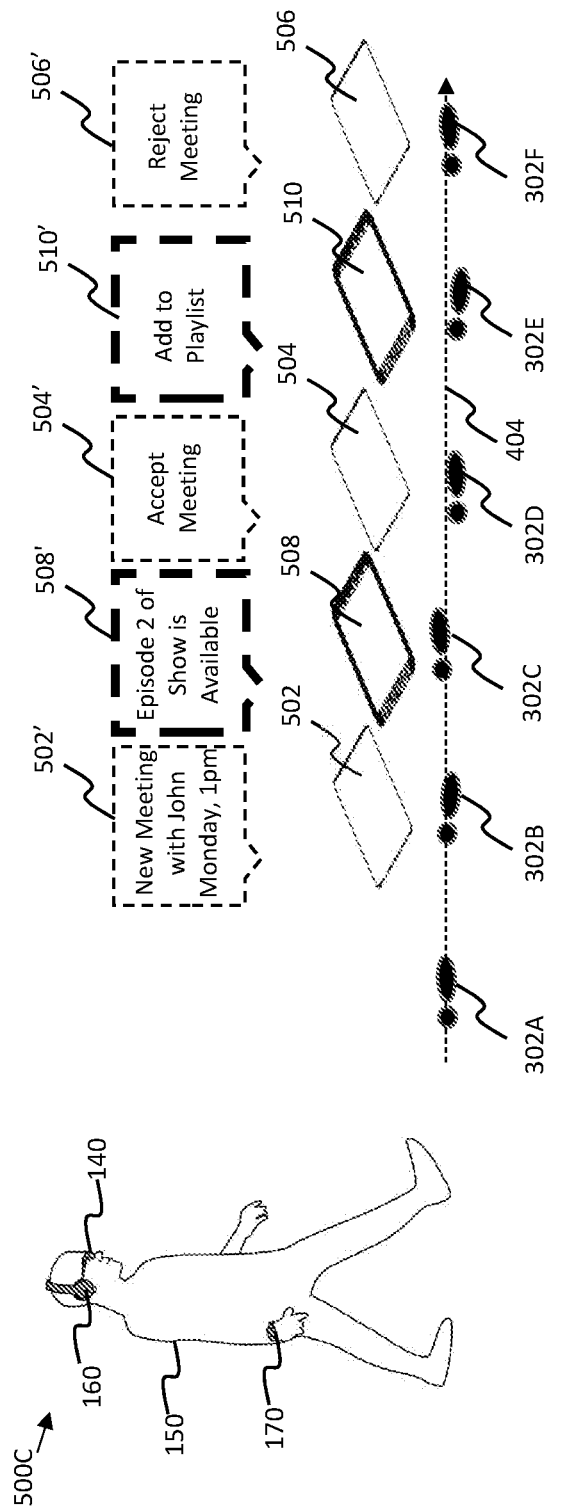
FIG. 5C is similar to FIG. 5B, wherein additional interactive items are associated with the in-between future step locations, according to another example embodiment.

For example, FIG. 5C shows a fifth scenario 500C whereby the first user notification 502 is still associated with the second future step location 302B and a new, second user notification 508 is displayed and associated with the third future step location 302C.

The second user notification 508 may be associated with a different application, in this case a video streaming application. As indicated by the dashed box 508', the second user notification 508 indicates that a new episode of a particular show is available on the video streaming application.

The first and second interactive items 504, 506 for the first user notification 502 are now associated with the third and sixth future step locations 302D, 302F respectively, and a first interactive item 510 for the second user notification 508 is associated with the fifth future step location 302E. As indicated by the dashed box 510', the first interactive item 510 enables a user to confirm or select to add the episode to their playlist. Further interactive items can be associated with later future step locations (not shown) further down the path 404.

In this way, it is possible for the user 150 to interactive with two (or more) applications in an intuitive way over a relatively short distance. Multi-tasking is made more convenient.

In some example embodiments, the manner of detecting a control input may be based on detecting a change or deviation in the user's motion away from the path formed by future step locations.

Deviation in motion may refer to at least part of the user's body, e.g. the movement of one foot. In other words, rather than using the estimated timing of the user's footsteps and receipt of a separate user input at a particular time, it is the change or deviation of the user's foot from the path that provides the control input; it can provide both an indication of a particular interactive element and confirmation of selection based on it not following the user's estimated path of travel.

Figure 6B:
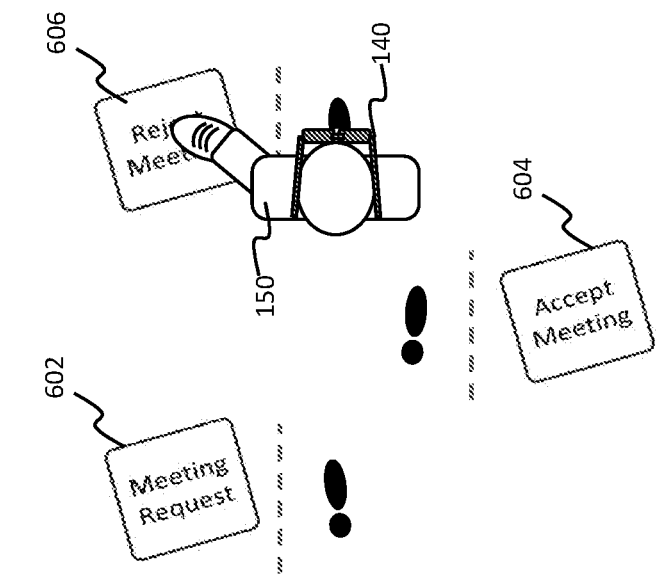
FIG. 6B is similar to FIG. 6A, showing the user at a later time when making a select input, according to another example embodiment.
Figure 6A:
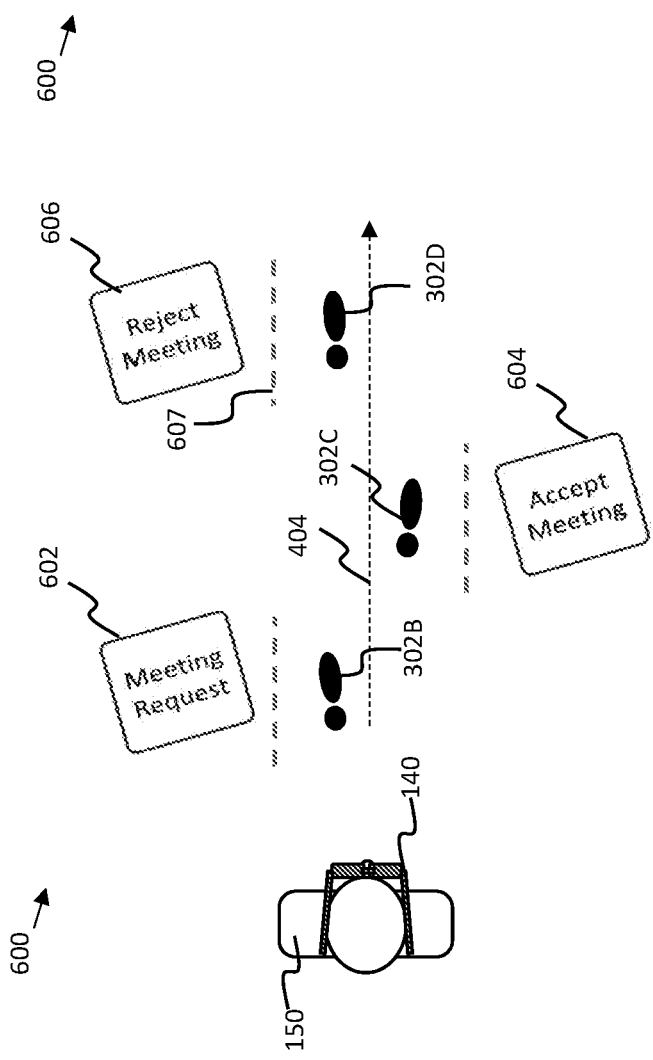
FIG. 6A is a plan view based on FIG. 5A, wherein the plurality of interactive items are presented to one side of the path, according to another example embodiment.

To illustrate, FIG. 6A shows a sixth scenario 600, in plan view, which builds on the first scenario 300 shown in FIG. 3.

In this scenario 600, the user 150 is moving along the path 404 as before. The AR display device 140 may display a first user notification 602, e.g. relating to a meeting request, to one lateral side of the second future step location 302B with respect to the path 404. The AR display device 140 may also display first and second interactive items 604, 606 at alternative lateral sides of the respective third and fourth future step locations 302C, 302D with respect to said path 404.

The first user notification 602 and the first and second interactive items 604, 606 are therefore aligned to the second, third and fourth step locations 302B, 302C, 302D, but are separate therefrom.

A dashed line associated with the second, third and fourth step locations 302B, 302C, 302D marks a start threshold or boundary of respective selection areas for each said step location. In FIG. 6A, and for ease of illustration, only one dashed line 607 is shown for the fourth step location 302D. The dashed line 607 is a threshold distance from the path 404 to help avoid accidental selections due to minor variations in the user's travel.

FIG. 6B shows the user 150 at a later time when selecting, in this case, the second interactive item 606. The user deviates their motion by stepping sideways (which can include diagonal sideways movement) over the dashed line 607 to enter the selection area of the second interactive item 606. Detection of sideways movement may be determined using any suitable means, e.g. use of the inertial sensors referred to above and/or external camera devices.

In this case, this may result in a "reject meeting" command being signalled to the calendar application.

Figure 7B:
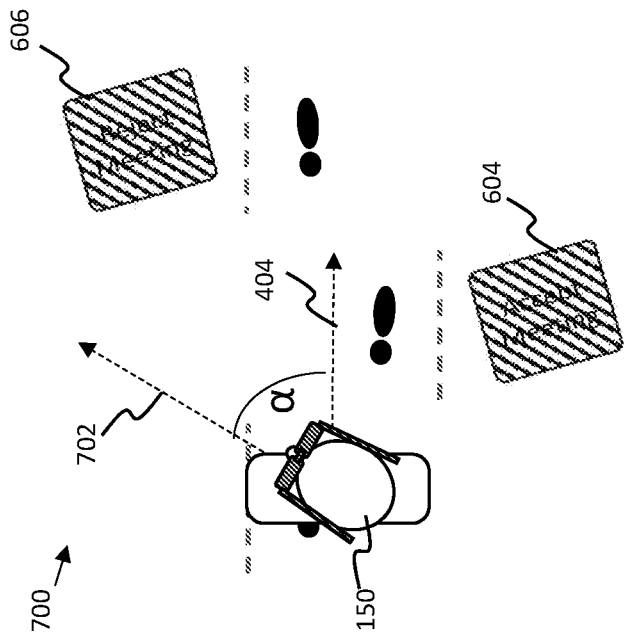
FIG. 7B is similar to FIG. 7A, showing the user at a later time when their gaze direction has changed by a threshold value, according to another example embodiment.
Figure 7A:
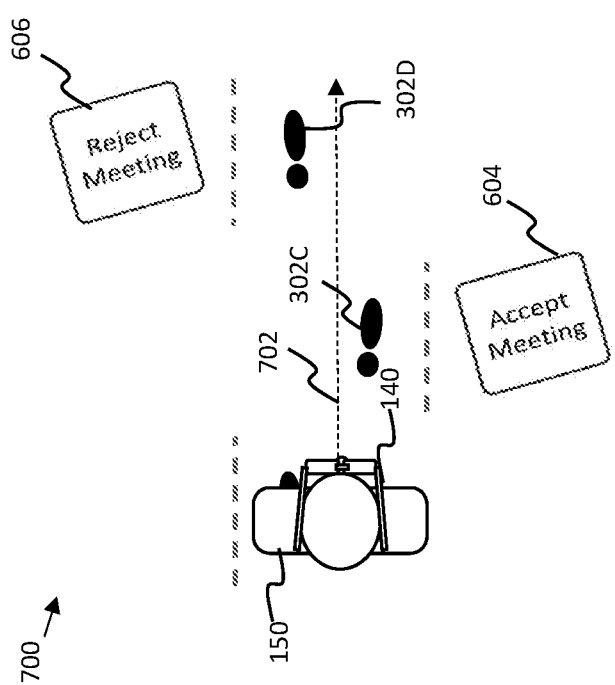
FIG. 7A is similar to FIG. 6A, wherein the user's gaze direction is determined.

FIG. 7A shows a seventh scenario 700, in plan view, which builds on the sixth scenario 600.

As shown, the user 150 is located at or near the second future step location 302B and can see via the AR display device 140 the first and second interactive items 604, 606.

The user's gaze or head orientation is indicated by the arrow 702 and is aligned with the path 404. Because this control method relies on the user 150 following and understanding the first and second interactive items 604, 606, and because no further user input is needed to make a selection other than sideways motion, there is a possibility of accidental selection if the user's gaze or head orientation were to change.

For example, in FIG. 7B, it is seen that the user's gaze direction 702 is no longer aligned to the path 404; there is an angle α of approximately 55 degrees in-between. It may be that the user 150 is observing some event or talking to another person. It may be assumed in this situation that any movement of a user's foot into a particular selection area will be unintended. Therefore, in accordance with some example embodiments, if the angle α is determined to be over a predetermined threshold $α_T$, e.g. over 30 degrees, at least the next interactive item may be disabled; in other words no control input may be detected in respect of that next interactive item, and possibly all future interactive items, so long as the angle α remains above $α_T$. Additionally, said future interactive items may not be displayed by the AR display device 140.

The value of $α_T$ may dynamically change depending on the pace of the user 150. The angle α may need to be greater than $α_T$ for longer than a predetermined period of time before disabling selection; this allows for momentary deviations in the user's gaze direction. If the user's gaze direction returns so that the angle α is below $α_T$, selection may be re-enabled.

In FIG. 7B, the first and second interactive items 604, 606 are shown blanked-out to indicate this condition.

For the avoidance of doubt, monitoring the user's gaze direction 702 to identify when it is no longer aligned to the path 404, e.g. by determining that angle α is above $α_T$, may also be applied (to disable selection of interactive items) for all scenarios described herein.

In some example embodiments, applicable to all above scenarios, user notifications and/or interactive items may be edited in terms of their association with future step locations. Editing may be performed at any time, or may result from the user 150 selecting to enter an edit mode by any suitable means.

FIG. 8A shows an eighth scenario 800 in which first and second groups 801, 803 of repeating items 802, 804, 806 are displayed to the user 150 by the AR display system 140. The first group 801 comprises "item 1" 802, "item 2" 804 and "item 3" 806 displayed at respective first, second and third future step locations 302A, 302B, 302C. The second group 803 comprises the same items 802, 804, 806 displayed at respective fourth, fifth and sixth future step locations 302D, 302E, 302F. In other example embodiments, each of the first and second groups 801, 803 may comprise a larger number of items.

The items 802, 804, 806 may represent any computer-related entity, for example interactive items, menu items, user notifications or a combination thereof. For example, each of the first, second and third items 802, 804, 806 may represent a respective music track in a playlist. The user 150 can select to play a particular music track based on a user input received when the user reaches the appropriate item. The repeating nature of the first and second groups 801, 803 (which may continue with a third group and so on) allows the user 150 to continually visualize and select from the playlist over the course of a journey.

If the user 150 wishes to remove an item from the playlist, e.g. item 2 804, they may make a particular gesture at the time they reach the second future step location 302B or they may step over the second future step location.

For example, referring to FIG. 8B, the user 150 is shown at the third future step location 302C, having stepped over the second future step location 302B. This stepping over event may be detected based on motion characteristics of the user 150. This may be based on data received from the above-mentioned inertial sensors or external cameras. For example, a detected step impact may be detected well after an expected impact time based on the user's current walking pattern. Upon detecting the stepping over event, the second item 804 is removed from the second (and any subsequent) group 803. The second item 804 may or may not be replaced. In the shown example, the third item 806 replaces the second item 804 at the fifth future step location 302E.

In some example embodiments, the user 150 may perform one or more predetermined operations which may cause previous interactive items to re-appear in the user's display. For example, one or more interactive items that were not selected or were recently-rejected may re-appear in the user's display at respective future step locations responsive to the user performing one or more predetermined operations such as, but not limited to, stepping backwards, a particular voice command and/or a particular gesture.

In any of the described example embodiments, the operations 200 described with respect to FIG. 2 may be performed responsive to a triggering event. For example, the media player 120 or AR display device 140 may be configured to sense when the user 150 is moving in a certain way, e.g. a predictable way and/or in a certain environment. For example, the media player 120 or AR display device 140 may sense that the user's 150 stride length and/or pace over the previous thirty seconds does not deviate beyond a predetermined threshold. For example, the media player 120 or AR display device 140 may sense that the user is outdoors, e.g. based on GNSS data and/or lack of any substantial WiFi signal. In one or both situations, the operations 200 described with respect to FIG. 2 may be triggered and any of the example embodiments may be employed to improve the AR experience.

Example embodiments provide a way of improving how users control devices and/or applications when using an AR display device. Some example embodiments may also simplify, or avoid, the use of voice commands, which may be beneficial to preserve privacy and/or because strong background noise may make voice commands imperceptible or unreliable.

Example Apparatus

Figure 9:
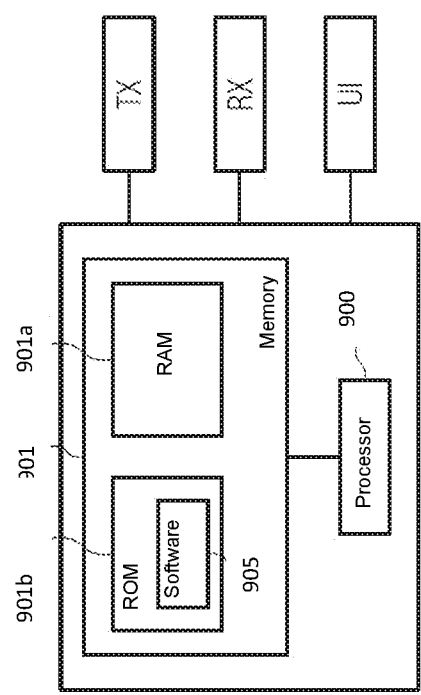
FIG. 9 is a block diagram of an apparatus for implementing one or more example embodiments.

FIG. 9 shows an apparatus according to some example embodiments, which may comprise the media player 120 and/or AR display device 140 if configured to perform the operations disclosed herein. The apparatus may be configured to perform the operations described herein, for example operations described with reference to any disclosed process. The apparatus comprises at least one processor 900 and at least one memory 901 directly or closely connected to the processor. The memory 901 includes at least one random access memory (RAM) 901a and at least one read-only memory (ROM) 901b. Computer program code (software) 905 is stored in the ROM 901b. The apparatus may be connected to a transmitter (TX) and a receiver (RX). The apparatus may, optionally, be connected with a user interface (UI) for instructing the apparatus and/or for outputting data. The at least one processor 900, with the at least one memory 901 and the computer program code 905 are arranged to cause the apparatus to at least perform at least the method according to any preceding process, for example as disclosed in relation to the flow diagram of FIG. 2 and related features thereof.

Figure 10:
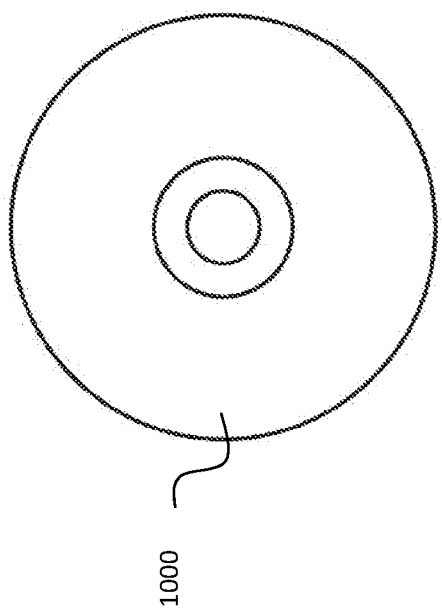
FIG. 10 is a plan view of a non-transitory computer-readable medium for storing code which, when executed by the apparatus of FIG. 9, may cause performance of a process according to one or more example embodiments.

FIG. 10 shows a non-transitory media 1000 according to some embodiments. The non-transitory media 1000 is a computer readable storage medium. It may be e.g. a CD, a DVD, a USB stick, a blue ray disk, etc. The non-transitory media 1000 stores computer program code, causing an apparatus to perform the method of any preceding process for example as disclosed in relation to the flow diagram of FIG. 2 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one memory storing instructions that, when executed by the at least one processor, cause the apparatus at least to:
   predict, based on monitoring of one or more motion characteristics of a user occurring in a predetermined time period prior to a current time, one or more future step locations along a path;

display, via an augmented reality display device associated with the user, one or more interactive items, from which one or more interactive items are associated with a respective one of the future step locations and displayed so as to be perceivable at a respective display position which is at or near said associated respective future step location; and detect a control input associated with a particular interactive item of the one or more interactive items associated with the respective one of the future step locations, based at least in part on the user having reached a selection area which is at or near said associated future step location along the path.

2. The apparatus of claim 1, further caused to display, via the augmented reality display device, a first user notification, and at least a first interactive item providing a first control option relating to the first user notification, the first control option being associated with a first future step location along the path.

3. The apparatus of claim 2, further caused to display, via the augmented reality display device, a second interactive item providing a second control option relating to the first user notification, the second control option providing an alternative to the first control option, the second control option being associated with the first future step location, or a second future step location after the first future step location along the path.

4. The apparatus of claim 3, wherein the second control option is associated with a second future step location after the first future step location, the first and second future step locations being separated by a third step location.

5. The apparatus of claim 4, further caused to display, via the augmented reality display device, a second, different user notification and wherein at least a control option relating to the second user notification is associated with the third step location.

6. The apparatus of claim 1, further caused to estimate a future time when the user will reach the selection area of the particular interactive item, and wherein the detection of the control input is further caused to receive a user input at or near the estimated future time.

7. The apparatus of claim 1, further caused to monitor a position of at least part of the user relative to the selection area of the particular interactive item, and wherein the detection of the control input is further caused to receive a user input when the position of said at least part of the user corresponds with the selection area.

8. The apparatus of claim 6, wherein the user input is at least one of a gesture, voice command or hardware input.

9. The apparatus of claim 1, wherein the selection area of the particular interactive item is separate, and lateral to, said associated future step location with respect to the path, and wherein the detection of the control input is further caused to determine that at least part of the user moves sideways from the path and into the selection area.

10. The apparatus of claim 1, further caused to monitor an angle between a gaze direction of the user and the path, and to disable detection of the control input for at least the particular interactive item if the monitored angle is greater than a predetermined amount.

11. The apparatus of claim 1, further caused to display a first group of interactive items at respective display positions, and a second group of interactive items, comprising the same plurality of interactive items, at later respective display positions, and wherein, responsive to a detection that the user has stepped over a selection area associated with a first interactive item of the first group of interactive items, the apparatus is further caused to remove the first interactive item from the second group of interactive items so that it is not displayed.

12. The apparatus of claim 1, wherein the prediction of the one or more future step locations is further based on an environment or terrain in which the user is currently located.

13. A method, comprising:
predicting, based on monitoring of one or more motion characteristics of a user occurring in a predetermined time period prior to a current time, one or more future step locations along a path;
displaying, via an augmented reality display device associated with the user, one or more interactive items, from which one or more interactive items are associated with a respective one of the future step locations and being displayed so as to be perceivable at a respective display position which is at or near said associated respective future step location; and
detecting a control input associated with a particular interactive item of the one or more interactive items associated with the respective one of the future step locations, based at least in part on the user having reached a selection area which is at or near said associated future step location along the path.

14. The method of claim 13, further comprising:
displaying, via the augmented reality display device, a first user notification, and at least a first interactive item providing a first control option relating to the first first user notification, the control option being associated with a first future step location along the path.

15. The method of claim 14, further comprising:
displaying, via the augmented reality display device, a second interactive item providing a second control option relating to the first user notification, the second control option providing an alternative to the first control option, the second control option being associated with the first future step location, or a second future step location after the first future step location along the path.

16. The method of claim 15, wherein the second control option is associated with a second future step location after the first future step location, the first and second future step locations being separated by a third step location.

17. The method of claim 16, further comprising:
displaying, via the augmented reality display device, a second, different user notification and wherein at least a control option relating to the second user notification is associated with the third step location.

18. The method of claim 13, further comprising:
estimating a future time when the user will reach the selection area of the particular interactive item, and wherein detecting the control input comprises receiving a user input at or near the estimated future time.

19. A non-transitory computer readable medium comprising program instructions that, when executed by an apparatus, cause the apparatus to perform at least the following:
predicting, based on monitoring of one or more motion characteristics of a user occurring in a predetermined time period prior to a current time, one or more future step locations along a path;
displaying, via an augmented reality display device associated with the user, one or more interactive items, from which one or more interactive items are associated with a respective one of the future step locations and being displayed so as to be perceivable at a respective display position which is at or near said associated respective future step location; and detecting a control input associated with a particular interactive item of the one or more interactive items associated with the respective one of the future step locations, based at least in part on the user having reached a selection area which is at or near said associated future step location along the path.

\* \* \* \* \*